Figure 1:
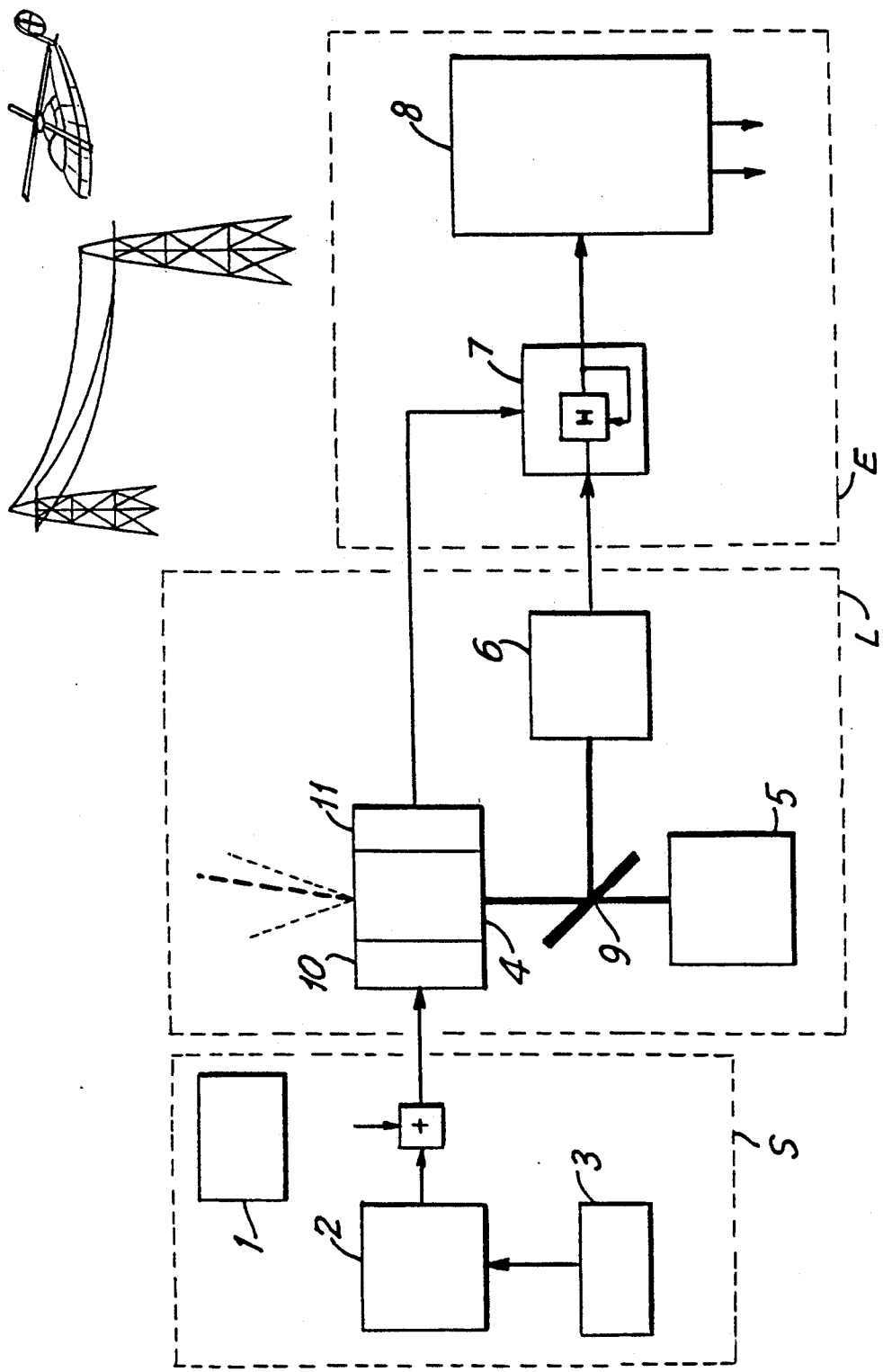

United States Patent [19]
Fazi et al.

[11] Patent Number: 5,296,909
[45] Date of Patent: Mar. 22, 1994

[54] DETECTOR OF SUSPENDED CABLES FOR AVIONIC APPLICATIONS

[75] Inventors: Marco Fazi, Rome; Filippo Modestini, Nemi, both of Italy

[73] Assignees: Alenia Aeritalia & Selenia S.p.A.; C.N.R., both of Rome, Italy

[21] Appl. No.: 854,639

[22] PCT Filed: Sep. 5, 1991

[86] PCT No.: PCT/IT91/00072

§ 371 Date: Jul. 7, 1992

§ 102(e) Date: Jul. 7, 1992

[87] PCT Pub. No.: WO92/04643

PCT Pub. Date: Mar. 19, 1992

[30] Foreign Application Priority Data

Sep. 7, 1990 [IT] Italy .............................. 48264 A/90

[51] Int. Cl.$^5$ .................... G01C 3/08; G01C 1/00; G01B 11/26
[52] U.S. Cl. ............................................ 356/5; 356/141
[58] Field of Search ......................... 356/5, 141, 152

[56] References Cited

U.S. PATENT DOCUMENTS 4,183,640  1/1980  Abe ................................. 354/25
4,572,662  2/1986  Silverman ....................... 356/5
4,902,126  2/1990  Koechner ....................... 356/5

FOREIGN PATENT DOCUMENTS 2258637  8/1975  France .
2123643  2/1984  United Kingdom .

OTHER PUBLICATIONS

R. Kleehammer et al., Optical Engineering, vol. 19, #6, Nov.-Dec. 1980, p. 92.

Primary Examiner—Stephen C. Buczinski
Attorney, Agent, or Firm—Cohen, Pontani, Lieberman, Pavane

[57] ABSTRACT

Detector of suspended cables specially suited for avionic applications formed mainly by a scanning system (S) provided with a noise generator (1) and scan concentrator (3); by a Lidar system (L) and an extractor system (E). The latter is composed of a background filter (7) and a chain extractor (8). This detector, if included in the on board instrumentation of light aircrafts and helicopters, is in condition of supplying the pilot with a warning signal if suspended cables are detected in the flight path during low altitude flights. The instrument gives the cable position and allows the selection of the right corrective move.

The invention finds its most convenient application in the flight safety field while that of the avionic optical radars is the specific technical field of this device.

9 Claims, 2 Drawing Sheets

DETECTOR OF SUSPENDED CABLES FOR AVIONIC APPLICATIONS

DESCRIPTION

This invention concerns a suspended cable detector specially suited for avionic applications. It is well known that some risks are encountered mainly by light aircrafts and helicopters when they are flying in areas traversed by suspended cables. The scope of this invention is of supplying the aircraft pilot with a warning system which, when suspended cables are present, allows the immediate selection of the evasive move to be effected. This alarm is the result of a very effective and reliable scan of the search area and of an extractor which can generate in time the alarm signal and supply the data related to the position parameters of the detected suspended cable.

In current practice the types of scan generally used in these applications were producing continuous curves in the specific search area by means of adjacent or partially superposed "spots" (pulsed emission beams).

These scans were obtained by moving the laser beam by means of easily made servomechanisms with two degrees of freedom. The most common curves used were the spiral, the rose curve and daisy curve. A cable inside the search area was detected, with a good probability figure, when the Lidar spot was passing over it owing to the continuity of the scan characteristic curve. The cable could be detected by observing a set of aligned intersection points. It must be admitted that these scan types shoved a very good performance, in terms of detection probability, when the cable was in the central part of the search area. In this case a large number of intercepts was obtained because the scan curve crossed many times the cable. The performance degraded as the cable moved off the center of the search area since the crosspoints were reduced rapidly. To improve the above performance the number of pulses emitted by the Lidar should be greatly increased in the scan time. This however could mean an increase of the emitted average power and consequently the increase of the overall dimensions and weight of the device.

A scan type which may be defined as "quasi-random" is proposed in the invention which is the subject of this patent application.

Its performance in the search area is more uniform than the previous solutions. The results of simulated tests show that there is a high probability of detecting a cable lying both in the central and peripheral portions of the search area. On the contrary a spiral scan in the same conditions and with the same number of spots gives a high detection probability in the central part but a low probability in the peripheral part of the search area. This scan is obtained by modifying, by means of suitable random signals, a uniform scan of conventional type. For instance a television Raster scan may be used.

The scan parameters are so selected that the search area is divided into many signal small areas equal in number to the Lidar PRF (Pulse Repetition Frequency) if the scan time is one second. At the center of each areola a Lidar spot is located. Only a small portion of this areola is covered by the spot due to its dimensions. The spots are anything but adjacent or superposed as in the scan types above montioned. The areolas may have equal or different dimensions so that consequently the spots may be concentrated in zones where the maximum performance is requested. The scan so far obtained is not very much effective to detect cables since the Lidar shots are concentrated along a limited number of diagonals inside the search area. An almost rectilinear cable, which is outside the areas defined by such diagonals and the width of the Lidar beam, has a low probability of being detected. On the other hand a cable which is inside the above areas has a number of intercepts exceeding those needed for its detection. By summing a small amplitude random movement to the Raster type movement of the beam the actual position of the spot inside the elementary area is made quasi-random. This feature breaks the intrinsic periodicity of the Raster scan and distributes the intercept probability on the whole scan frame.

The bandwidth of the random movement must be such as to reduce to a minimum the correlation between the position of two successive spots inside their areolas; the bandwidth must also be compatible with the response bandwidth of the scan servos. In case some special cable positions may be excluded the scan may be greatly simplified. For instance if vertical cables in the search area are excluded the random movement in the Azimuth direction may be reduced or suppressed.

As far as the Extractor is concerned the cable detection is in general committed to the operator eye or to simple computing systems which identify a set of Lidar intercepts lined up in the Azimuth/Elevation plane.

The performance of such identification systems is very poorly effective in respect of the number of target intercepts and becomes even worse in presence of backgrounds which are targets at the same time. The proposed Automatic Extractor has a very good effectiveness in respect of the target intercept number. Only three intercepts may be sufficient to identify a suspended cable. In addition the Extractor shows a good discrimination against false alarms both distributed (i.e. from generator random noise or from background) and concentrated (i.e. from reflecting continuous backgrounds as buildings, sheets of water etc.) which may be present in the search area. The Automatic Extractor is composed mainly of two parts: the background filter (7) and the chain extractor (8). The first is a fast digital device which, during each scan time, gathers the spatial data (Azimuth, Elevation, Distance) of each intercept, being stimulated by the optical receiver. The data are converted in a suitable coordinate system and are recorded in a memory called "detection matrix". This matrix contains the data set, related to the actual target status in the search area, gathered by Lidar in a scan time. The matrix is formed by the geometric parameters of the Lidar detection of each point. The background filter finds special correlations between the detections as a function of their relative positions in the geometric cartesian space. The aim is of reducing the influence of reflecting continuous backgrounds of no interest. In particular the above filter excludes from the detection matrix almost all the alarms coming from such backgrounds. To this purpose, when a new detection is stored, the background filter calculates its distance from the already gathered detections (during the actual scan time). All the detections whose distance is less than a given threshold (a few meters) are erased from the memory and the corresponding areas are made available for the collection of further detections. Therefore the filter, besides the effective reduction of the false alarm probability, greatly reduces the memory which stores the data to be used for the successive extraction process. The background effectiveness is greatly influenced by the type of scan. A scan of the Raster type gives the best results. The target status inside the search area referred to the last scan and stored in the detection matrix is transmitted to the chain extractor. Since a laser with a low PRF is used to limit the weight and dimensions of the device, the coverage of the search area is absolutely incomplete. The chain extractor takes advantage of the property of the intercepts generated by a cable. These intercepts are lying on well known curves as straight lines or stretches of catenary while false detections, caused by receiver noise or random background signals, are randomly distributed in space. The operation of the chain extractor may be divided into three phases:

Assembly of all the possible n-element groups from the whole detection ensemble with the calculation of their characteristic parameters and the record of these data in a Parameter Matrix. A point in the parameter space corresponds to each group. The selection of groups and their parameters may be carried out, for instance, according to the Hough transform criteria. By assuming that each group is formed by two elements the characteristic parameters are at least four and identify the straight lines which connect each pair of detections.

Composition of chains of the above points inside the parameter space. Each chain is formed by all the adjacent points in this space. In the assumption of two element groups each chain puts together a bundle of straight lines of similar orientation and position in the cartesian space.

Look-up of the most numerous chain. If the number of events (groups or points) exceeds a given threshold a cable presence alarm is generated. The cable position is evaluated by calculating the average of the event parameters associated to the chain. In the assumption of two element groups the minimum threshold value is three; this corresponds to the detection of at least three points nearly aligned in space and to the evaluation of the best straight line connecting them.

Results of simulated tests made according to the above assumptions show the large discriminating capability of the algorithm against random non-correlated false alarms.

The method of chain association was already used with good results in ESM systems (Electronic Support Measures) for pulse association and radar emission reconnaissance. This method allows the operation in an n-dimensional space with the use of a number of memory locations not exceeding the one really occupied by the events "under association". A very large saving of hardware resources results from the comparison of this method with an equivalent method of histogram association. In addition a better non biased evaluation of parameters is obtained at the cost of an increased computational load.

Figure 2:
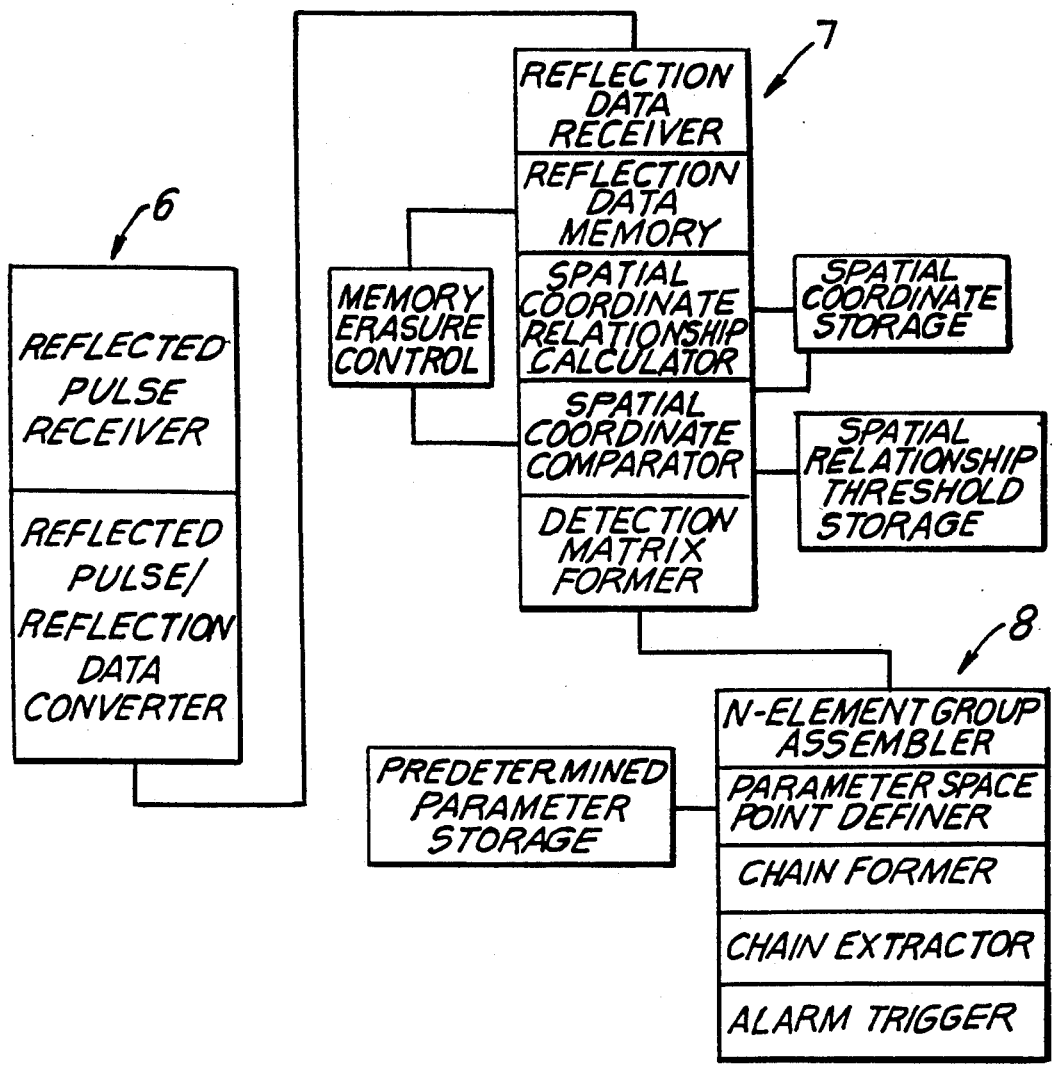

The invention is now described for illustrative but not limitative reasons with reference to FIGS. 1 and 2 which show the main elements forming the system in a block diagram.

The scan system S is composed of:
Noise generator 1
Raster generator 2
Scan concentrator 3
The Lidar assy is composed of:
Aiming optics 4
Angular actuator 10
Laser transmitter 11
Optical receiver 6
Beam splitter 9
The Extractor assy is mainly formed by:
Background filter 7
Chain extractor 8

Before proceeding to describe the operation of the system its elements are described in more detail. The noise generator (1) is a low frequency (audio band) random voltage (or current) generator. It may be implemented by amplifying and filtering the shot noise produced by a resistor maintained at controlled temperature. This voltage is used by the scan device to break the deterministic relation between successive pointings which is typical of a conventional scan. The Raster generator (2) is formed by electric and electronic circuitry which generate the driving voltages of the electric actuators of the pointing optics. The basic voltages show the typical time function of a conventional scan like Raster. The two sawtooth voltages have repetition frequencies corresponding respectively to the line scan and frame scan frequencies. The frame repetition frequency is defined by the device updating specification which is usually one second. The line scan frequency, which sets the spacing between the horizontal lines, and the scan average speed are so selected that the beam spots are uniformly distributed on the search area. This corresponds to divide the whole area into square elementary areolas equal in number to the Lidar PRF. The scan circuit then sums to the scan waveforms:

the noise generator voltage so that the actual position of the spot becomes quasi-random inside the elementary areola.

the scan concentrator voltage to slow down or speed up the scan motion in order to raise the spot number in the areas where an increased probability of target detection is needed.

The scan concentrator (3) is composed of electronic circuits whose output is a variable amplitude voltage or current. The amplitude is a function of the actual spot position in accordance with the specified distribution of the target detection probability inside the search area.

The aiming optics (4) and the angular actuator (10) form a mechanical assy that, at the reception of the scan commands, directs inside the search area the beams of the laser transmitter (5) and of the optical receiver (6) which have been properly superposed in advance. The beam deflection may be obtained by means of mirror and/or prism optical systems moved by electric motors or by beam deflectors based on acoustooptical interaction.

The instantaneous beam position is measured by the angular restorer (11) composed, for instance, of two optical encoders and it is sent to the background filter which associates this information with the distance coming from the optical detector.

The transmitter (5) is an assy formed by the laser radiation generator and its power supply. It works at a wavelength which shows a low attenuation by the atmosphere and it is safe to the eye. The radiation pulse PRF allows the coverage of the search area in less than one second with the scanning law imposed by the scan system. The pulses are sent to the pointing optics (4) through the beam splitter (9).

The optical receiver (6) is composed mainly by a focusing optics, spatial and spectral filters, which suppress the background radiation, and by the sensing element with its electronic circuits.

The target backscattered radiation is directed through the aiming optics (4) to the beam splitter (9) which provides for its sending to the input of the assembly.

The receiver (6), by measuring the laser pulse time-of-flight, can evaluate the target distance. This value is sent to the background filter which provides for its further processing.

The background filter (7) is a fast digital device which, by receiving signals from the optical receiver, performs the following operations:

gathers the distances measured by the optical receiver connects the above distances with the Azimuth/Elevation pointing positions (calibrated delays compensate for the differences of the signal propagation times).

operates the conversion from polar to cartesian of the spatial coordinates constructs the detection matrix (M) by erasing step-by-step all the intercepts lying within a given distance from the last one. In this way owing to the used scan type (randomized raster) the intercepts due to the back echoes from building walls or other continous surfaces are practically suppressed. The dimensions of the memory which stores the detections and the probability of detecting non-existent cables are greatly reduced by the above method. At the end of the scan the detection matrix is transferred to the chain extractor (8) for further processing. The chain extractor is a fast digital computer which processes the detection matrix.

It makes use of the known in advance target features and form and sends out a signal of presence of a suspended cable with the relevant position coordinates. The purpose is of supplying a warning signal and the route which avoids the collision to the pilot. To attain this objective the chain extractor (8), when receives the detection matrix from the background filter (7) carries out a process which may be divided into three parts:

Assembly of all the possible n-element groups from the whole intercept ensemble of the detection matrix and calculation of the characteristic parameters of each group.

Composition of chains, formed by the above groups, in the parameter space.

Look-up of the most numerous chain, generation of the cable presence alarm signal and computation of cable position.

With reference to the block diagram of FIG. 1 the operation of the detector, object of this invention, is described below: The system installed on an aircraft is supposed powered and operative.

a) The scan system S sends to the pointing optics the sawtooth signals modulated by the outputs of the noise generator (1) and scan concentrator (3).

b) The aiming optics (4) provides for the pointing of the laser transmitter beam (5) inside the search area by means of the angular actuator. At the same time the angular restorer (11) sends the actual Azimuth/Elevation position to the background filter (7).

c) The laser transmitter (5) generates pulses at the prefixed PRF which are sent to the pointing optics.

d) The optical receiver (6) as soon as receives an echo which exceeds the threshold emits a detection signal and measures the target distance.

e) The background filter (7) carries out the following operations on each detection and each measured distance.

e1) puts together the corresponding polar coordinates of the actual point.

e2) transforms the polar into cartesian coordinates.

e3) stores the cartesian coordinates in the first available memory location.

e4) calculates the distance, in the tridimensional space, between the actual detection and all the detections already stored in the memory.

e5) erases from the memory all the detections whose distance from the actual detection is less than a preset threshold so that their memory locations become available for further detections.

e6) transmits the detection matrix to the extractor at the end of the scan period.

f) The extractor (8) performs three sets of operations on each detection matrix coming from the background filter (7) at the end of each scan period. These operations are:

f1) the assembling of all the possible n-element groups from the detection matrix and the evaluation of a set of parameters for each group according to the criteria of Hough transform. Therefore a point in the parameter space is defined for each group.

f2) the forming of group chains; each chain is characterized by a forebear. All the points within a limited area around the forebear are associated to the same chain; point clusters in the parameters space are so identified.

f3) the identification of the most numerous chain. If the number of events which forms this chain exceeds a threshold an alarm is generated. The cable position is determined by performing the Hough inverse transform on the average of the event parameters associated to the above chain.

The most significant part of the invention resides in the system configutation which considers the introduction of a Lidar system between the scanning element and the extractor.

This system, according to the opinion of the owner and the inventors, may be represented at best by a product of their own design.

We claim:

1. An apparatus for detecting thin, elongated objects suspended in the flight path of a flying vehicle, the apparatus comprising:

means for generating a scan signal conforming to a raster scan signal modulated by random noise;

means for driving a repetitively pulsed laser beam, said driving means being responsive to said scan signal for driving said laser beam pulses in a search path of motion conforming to a randomly modified raster scan pattern within a predetermined scan period;

means for receiving reflected laser beam pulses, said reflected laser beam pulses being formed as said laser beam pulses are reflected from an object within said search path;

means for converting each of said reflected laser beam pulses into reflection data conforming to a three dimensional spatial relationship between the point of reflection of said laser beam pulse from said object and said vehicle; and means for discriminating desired target reflections from background reflections, said discriminating means comprising:

means for analyzing said reflection data so as to identify specific reflection data falling within a predetermined spatial range; and means for processing said specific reflection data received during said scan period so as to assemble said specific reflection data into configurations, and so as to identify the conformance of said configurations of said specific reflection data with preselected configurations, such that identification of conformance triggers an indication of the presence of a thin, elongated object in the flight path of said flying vehicle to an operator of said flying vehicle.

2. The apparatus according to claim 1, wherein said scan signal generating means comprises:
   a scan concentrator voltage generator for generating a scan speed control voltage;
   a raster signal generating circuit for receiving said scan speed control voltage and for outputting raster scan voltage signals responsive thereto;
   a noise generating circuit, connected to the output of said raster signal generating circuit for introducing random noise to said raster scan volrage signals, so as to impart random variances in said raster scan voltage signals, so that random variances are introduced in said search path of said pulsed laser beam.

3. The apparatus according to claim 2 wherein raster signal generating circuit generates raster scan voltages for driving said pulsed laser beam, said pulsed laser beam having a preselected pulse repetition frequency, and wherein said scan speed control voltage and said raster scan voltages are so selected as to provide a search path in which said laser beam pulses are uniformly distributed within said search path, said search path being divided into elementary areolas equal in number to said pulse repetition frequency, each of said elementary areolas having therewithin a search spot formed by a single laser beam pulse.

4. The apparatus according to claim 3, wherein said random variances in said search path introduced by said noise generating circuit cause the actual position of said search spot within said elementary areolas to be quasi-random.

5. The apparatus according to claim 1, wherein said driving means further comprises means for tracking the position of said laser beam within said search path and generating beam position data for output to said analyzing means, said analyzing means analyzing said beam position data signals and said reflected data signals so as to correlate the position of said laser beam pulses with the position of said reflected laser beam pulses received by said receiving means for generating said specific reflection data.

6. The apparatus of claim 1 wherein said discriminating means comprises:
   a first multifunction means for sequentially receiving and storing, during said scan period, said reflection data in memory spaces of a memory within said analyzing means;
   means for calculating the spatial coordinate relationships between the most recently sequentially received reflection data and all previously received and stored reflection data in said memory;
   a second multifunction means for comparing said calculated spatial relationships with preselected spatial relationship thresholds and identifying stored reflection data exceeding said thresholds;
   means for erasing from said memory spaces reflection data exceeding said thresholds so as to continuously make memory spaces available in said memory during said scan period;
   means for forming a detection matrix of all reflection data within said thresholds at the end of each scan period;
   a third multifunction means for assembling all possible n-element groups from the detection matrix and evaluating a predetermined set of parameters in a parameter space for each group according to Hough transform criteria, so as to define a point in said parameter space for each group;
   means for forming chains of points by associating together points falling within a predetermined limited area relative to each other;
   means for identifying chains having the greatest number of points in said parameter space; and
   means for generating an alarm signal to alert an operator of said vehicle if the number of points forming said chains identified by said previously mentioned means exceeds a preselected number.

7. The apparatus according to claim 6, wherein said n-element groups are two-element groups and said preselected number of points is three.

8. The apparatus according to claim 7, wherein said scan period is one second.

9. The apparatus according to claim 1 wherein said driving means comprise:
   a laser transmitter for transmitting a pulsed beam of laser light having a predetermined pulse repetition frequency;
   aiming optics for aiming said laser beam pulses and for receiving reflected laser beam pulses;
   an angular actuator responsive to said scan signals from said generating means and connected to said aiming optics for driving said aiming optics in said search path of motion;
   an angular restorer connected to said aiming optics for tracking the position of said aiming optics within said search path of motion; and
   a beam splitter for passing said laser beam from said laser transmitter to said aiming optics and for passing reflected laser beam pulses from said aiming optics to said reflected laser beam receiving means.

* * * * *